US006859692B2

(12) United States Patent
Okuyama

(10) Patent No.: US 6,859,692 B2
(45) Date of Patent: Feb. 22, 2005

(54) INFORMATION TRANSMITTING DEVICE AND INFORMATION TRANSMITTING METHOD FOR WATERCRAFT

(75) Inventor: Takashi Okuyama, Shizouka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 23 days.

(21) Appl. No.: 10/618,449

(22) Filed: Jul. 11, 2003

(65) Prior Publication Data

US 2004/0059478 A1 Mar. 25, 2004

(30) Foreign Application Priority Data

Jul. 11, 2002 (JP) ........................................ 2002-202031

(51) Int. Cl.⁷ ................................................ B60L 15/00
(52) U.S. Cl. ...................................................... 701/21
(58) Field of Search ...................... 701/21, 99, 114–115

(56) References Cited

U.S. PATENT DOCUMENTS

| | | | |
|---|---|---|---|
| 4,497,057 A | | 1/1985 | Kato et al. |
| 4,692,918 A | | 9/1987 | Elliott et al. |
| 4,796,206 A | | 1/1989 | Boscove et al. |
| 4,817,466 A | | 4/1989 | Kawamura et al. |
| 4,822,307 A | | 4/1989 | Kanno |
| 4,938,721 A | | 7/1990 | Koike |
| 5,031,562 A | | 7/1991 | Nakase et al. |
| 5,136,279 A | | 8/1992 | Kanno |
| 5,230,643 A | | 7/1993 | Kanno |
| 5,245,324 A | | 9/1993 | Jonker et al. |
| 5,325,082 A | | 6/1994 | Rodriguez |
| 5,352,138 A | | 10/1994 | Kanno |
| 5,390,188 A | * | 2/1995 | Dawson ...................... 714/717 |
| 5,852,789 A | | 12/1998 | Trsar et al. |
| 5,904,604 A | | 5/1999 | Suzuki et al. |
| 5,935,187 A | | 8/1999 | Trsar et al. |
| 6,055,468 A | | 4/2000 | Kaman et al. |
| 6,141,608 A | | 10/2000 | Rother |
| 6,216,083 B1 | | 4/2001 | Ulyanov et al. |
| 6,330,553 B1 | | 12/2001 | Uchikawa et al. |
| 6,529,816 B1 | | 3/2003 | Yamaguchi et al. |
| 2001/0049579 A1 | * | 12/2001 | Fujino et al. ............... 701/114 |

FOREIGN PATENT DOCUMENTS

| | | |
|---|---|---|
| EP | 0 962 871 A2 | 12/1999 |
| JP | 05-185987 | 7/1993 |
| JP | 10-011105 | 1/1998 |
| JP | 10-184429 | 7/1998 |
| JP | 10-184431 | 7/1998 |
| JP | 10-319950 | 12/1998 |
| JP | 11-343916 | 12/1999 |
| JP | 2000-076300 | 3/2000 |
| JP | 2001-119416 | 4/2001 |
| JP | 2001-236317 | 8/2001 |

OTHER PUBLICATIONS

NMEA 2000; Standard for Serial Data Networking of Marine Electronic Devices; Main Document; Version 1.000, Sep. 12, 2001; @NMEA 1999, 2000, 2001.

(List continued on next page.)

*Primary Examiner*—Yonel Beaulieu
(74) *Attorney, Agent, or Firm*—Knobbe, Martens, Olson & Bear LLP

(57) ABSTRACT

A multiple node network includes a plurality of terminal nodes. A management node at least initially manages the terminal nodes. A bus connects the respective terminal nodes and the management node to one another. The respective terminal nodes and the management node communicate with one another using the bus. The management node requests identification codes from each terminal node. Each terminal node responds with an individual identification code and then receives a physical address from the management node to establish communication. When a fault in the management node is detected while a terminal node is trying to enter communication, the terminal node assigns an arbitrary address to establish communication if the arbitrary address is not identical to any other terminal node address or after a predetermined amount of time has elapsed.

34 Claims, 10 Drawing Sheets

OTHER PUBLICATIONS

NMEA 2000; Standard for Serial Data Networking of Marine Electronic Devices; Appendix A; Version 1.000; Sep. 12, 2001; @NMEA 1999, 2000, 2001.

NMEA 2000; Standard for Serial Data Networking of Marine Electronic Devices; Appendix B;@NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Data Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783–5 Network Management.

NMEA 2000; Standard for Serial Data Networking of Marine Electronic Devices; Appendix F; ISO 11783–3 DataLink Layer.

NMEA 2000; Standard for Serial Data Networking of Marine Electronic Devices; Appendix G; ISO 11898 Controller Area Network.

International Standard; ISO 11783–5; Tractor and machinery for agriculture and forestry—Serial control and communications data network; Part 5: Network management; First edition May 1, 2001.

Co–pending U.S. Appl. No.: 10/251,722; filed Sep. 20, 2002, entitled Engine Control System for Watercraft, inventor Isao Kanno, assigned to Sanshin Kogyo Kabushiki Kaisha.

Co–pending U.S. Appl. No.: 10/247,919; filed Sep. 20, 2002, entitled Inspection System For Watercraft, inventors Takashi Okuyama and Isao Kanno, assigned to Sanshin Kogyo Kabushiki Kaisha.

Co–pending U.S. Appl. No.: 10/255,042; filed Sep. 25, 2002, entitled Diagnostic System For Watercraft, inventors Isao Kanno and Hitoshi Motose, assigned to Sanshin Kogyo Kabushiki Kaisha.

Co–pending U.S. Appl. No.: 10/254,818; filed Sep 25, 2002, entitled Watercraft Management System, inventors Takashi Okuyama and Hitoshi Motose, assigned to Sanshin Kogyo Kabushiki Kaishi.

Co–pending U.S. Appl. No.:, 10/280,262; filed Oct. 24, 2002, entitled Watercraft Control Systems, inventors Isao Kanno and Takashi Okuyama, assigned to Sanshin Kogyo Kabushiki Kaisha.

Co–pending U.S. Appl. No.: 10/281,390; filed Oct. 24, 2002, entitled Small Watercraft And Outboard Motor, inventor Isao Kanno, assigned to Sanshin Kogyo Kabushiki Kaisha.

* cited by examiner

INFORMATION TRANSMITTING DEVICE AND INFORMATION TRANSMITTING METHOD FOR WATERCRAFT

PRIORITY INFORMATION

The present application is based on and claims priority under 35 U.S.C. § 119 to Japanese Patent Application No. 2002-202031, filed on Jul. 11, 2002, the entire content of which is expressly incorporated by reference herein.

BACKGROUND OF THE INVENTION

1. Field of the Invention

The present invention generally relates to a multiple node network and a communication method within the network. The present invention more particularly relates to a network having a plurality of terminal nodes and a management node that manages the terminal nodes and also to a communication method among the terminal nodes and the management node.

2. Description of Related Art

Computerized controls have become popular for various systems such as, for example, land vehicles and watercrafts in recent years. Components of the systems such as engines and navigation devices typically are connected with each other using a network. Engines, navigation devices, and other components can represent terminal nodes of the network. A bus connects the respective terminal nodes. A management node also is provided within the network and is connected to the bus to manage the terminal nodes.

The terminal nodes and the management node frequently communicate with each other through the bus. Generally, the bus is common to all of the nodes. In order for these nodes to communicate with each other, each node must be assigned an address by an address allocating unit. In some particular instances, a node may be activated after all the other nodes have been assigned an address. This new node must also be assigned an address that is recognized by the other nodes. However, in the case where the newly entering node cannot receive an address due to malfunction, that newly entering node cannot communicate with the other nodes. The assignment of an address by the address allocating unit of the newly activated node thus fails. Accordingly, the network is unable to communicate with the newly activated node.

SUMMARY OF THE INVENTION

A need therefore exists for an improved network in which a newly joining node can easily obtain a physical address when joining a network even in the event of a failure of the address allocating unit.

In accordance with one aspect of the present invention, a multiple node network comprises a management node, a plurality of terminal nodes, and a bus arranged to connect and provide communication among the terminal nodes and the management node. The management node sends an individual information transfer demanding frame to each terminal node and at least one terminal node responds to the management node with an individual information response frame. The management node allocates a network address to each terminal node through a network address notification frame. At least one terminal node is capable of allocating an arbitrary network address upon receiving no allocated network address from the management node when the terminal node is attempting to join the network and the terminal node determines that the management node has a fault. The arbitrary network address is converted to a network address by the terminal node when no other terminal node has a network address identical to the arbitrary address.

In accordance with a further aspect of the present invention, a communication method between a plurality of nodes in a network is provided. The nodes include terminal nodes and a management node configured to at least initially manage the terminal nodes. The method comprises the management node sending an individual information transfer demanding frame to one or more of the terminal nodes and the one or more terminal nodes responding to the management node with an individual information response frame. The management node allocates a network address to the responding terminal node through a network address notification frame. At least one of the terminal nodes applies an arbitrary address upon detection that the management node has a fault when a terminal node is trying to join the network. The at least one terminal node converting the arbitrary address to an operating network address when no response from the management node is received and no other terminal node has been assigned the arbitrary address.

In accordance with a further aspect of the present invention, a communication method between a plurality of nodes in a network is provided. The nodes include terminal nodes and a management node configured to assign network addresses to each of the terminal nodes in normal operation. The method comprises determining a failure by the management node to assign a network address to one of the terminal nodes and selecting an arbitrary network address for the one terminal node. The method further comprises determining whether the arbitrary network address is identical to a network address currently used by one of the other terminal nodes. The method uses the arbitrary network address as the network address for the one terminal node if the arbitrary network address is not identical to a network address used by one of the other terminal nodes.

In accordance with a further aspect of the present invention, a communication system for a vehicle comprises an engine, at least one sensor detecting an operating condition of the vehicle, and a network having a plurality of terminal nodes and a management node. At least one terminal node communicates with the engine and at least another one of the terminal nodes communicates with at least the sensor. The management node is adapted to assign a network address to each terminal node when the terminal node is attempting to join the network. Each terminal node is capable of determining whether the management node has failed to assign the terminal node a network address and assigns itself a network address that is not currently used by any other terminal node active on the network.

BRIEF DESCRIPTION OF THE DRAWINGS

The foregoing and other features, aspects and advantages of the present invention are described in detail below with reference to the drawings of a preferred embodiment, which is intended to illustrate and not to limit the invention. The drawings comprise ten figures in which.

DETAILED DESCRIPTION OF THE PREFERRED EMBODIMENT

Figure 1:
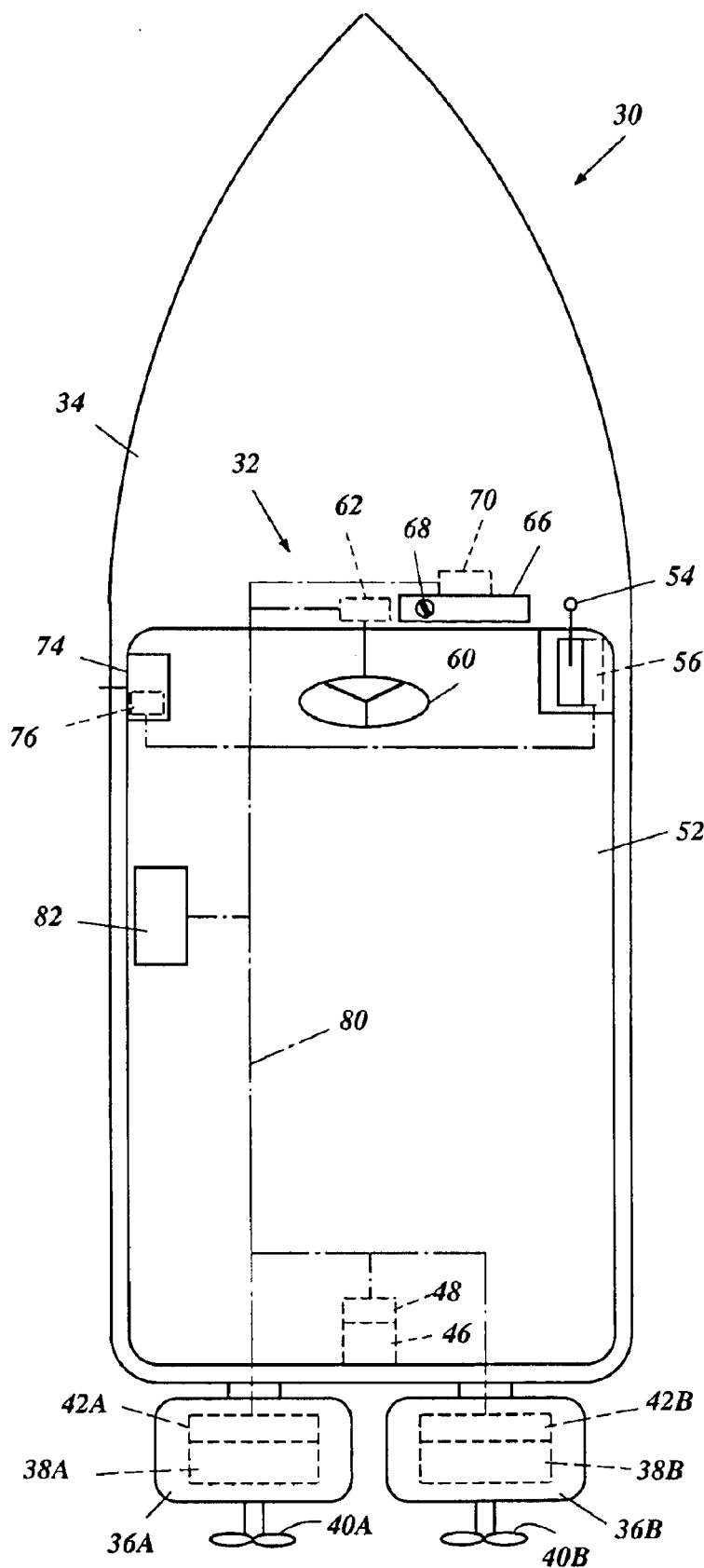
FIG. 1 schematically illustrates a top plan view of a watercraft propelled by a pair of outboard motors and provided with a controller area network (CAN) that includes a management node and at least one terminal node and is configured in accordance with a preferred embodiment of the present invention.

With reference to FIG. 1, a watercraft 30 includes a controller area network (CAN) 32 for the watercraft 30. The CAN 32 is one type of a local area network (LAN). While a network is described in connection with this particular type of network (i.e., the CAN 32) for the particular type of system (e.g., the watercraft 30), those of skill in the art will appreciate that the present invention may have utility in a wide range of applications for other types of networks that are used for other systems such as, for example, land vehicles, toys, game machines, factory control systems, building management systems or the like.

The watercraft 30 has a hull 34. At least one drive unit propels the hull 34. In the illustrated embodiment, a pair of outboard motors 36A, 36B preferably are mounted on a transom of the hull 34 as the drive units to propel the hull 34. Other marine drives such as, for example, stem drives can replace the outboard motors 36A, 36B. Each outboard motor 36A, 36B incorporates a prime mover. The prime mover in the illustrated embodiment is an internal combustion engine 38A, 38B. Other types of prime movers such as, for example, electric motors can replace the engines 38A, 38B in other embodiments.

Each engine 38A, 38B incorporates one or more throttle valves in an air intake system to regulate a rate of airflow amount delivered to combustion chambers of the engine 38A, 38B. A throttle valve actuator preferably is coupled with valve shafts or a common valve shaft of the throttle valves to actuate the throttle valves. The throttle valve actuator can be formed with an electric motor or stepper motor, for example. Normally, the greater the throttle valve opens, the higher the rate of airflow amount into the engine and the higher the engine speed.

Each engine 38A, 38B preferably is provided with a fuel injection system that has fuel injectors spraying fuel directly into the combustion chambers or into a portion of the air intake system for combustion in the combustion chambers. Each engine 38A, 38B also is provided with an ignition or firing system that has spark plugs to ignite air/fuel charge in the combustion chambers of the engine.

Each outboard motor 36A, 36B has a propulsion unit that is powered by the engine 38A, 38B. The propulsion unit preferably is a propeller 40A, 40B. Other types of propulsion units such as, for example, a dual counter-rotating system or a hydrodynamic jet can replace the propeller 40A, 40B in other embodiments.

The outboard motor 36A, 36B also has a transmission mechanism that sets the propeller 40A, 40B for either forward, neutral or reverse operation. Each transmission mechanism preferably incorporates a transmission actuator to switch the trasmission mechanism among forward, neutral and reverse positions that correspond to the forward, neutral and reverse operations of the propeller 40A, 40B, respectively. The transmission actuator can be formed with an electric motor, for example. The watercraft 30 proceeds forward when each propeller 40A, 40B is set in the forward operation, while the watercraft 30 proceeds backward when each propeller 40A, 40B is set in the reverse operation. The propellers 40A, 40B do not drive the watercraft 30 when they are set for neutral operation.

In the illustrated embodiment, each outboard motor 36A, 36B is rotatable relative to the transom of the hull 34 to steer the watercraft 30. A steering actuator such as, for example, an electric motor is provided at each outboard motor 36A, 36B. The outboard motors 36A, 36B pivot about respective steering axes that lie generally vertical. Preferably, the steering movements of both the motors 36A, 36B are synchronized. In one variation, the outboard motors 36A, 36B are mechanically linked to move together in the same steering range. Additionally, each outboard motor 36A, 36B can be tiltable about a generally horizontal tilt axis.

Each outboard motor 36A, 36B has a drive node 42A, 42B electrically coupled with the throttle valve actuator, the fuel injectors, the spark plugs, the transmission actuator and the steering actuator. In one variation of the illustrated embodiment, each outboard motor 36A, 36B can have an engine node electrically coupled with the throttle valve actuator, the fuel injectors and the spark plugs and also a propulsion node electrically coupled with the transmission actuator and the steering actuator. That is, the drive node can be divided into the engine node relating to the engine components such as the throttle valve actuator and the propulsion node relating to the propulsion components such as the transmission actuator. Further grouping and division of the outboard motor components are also possible to suit a particular application.

A watercraft velocity sensor 46 preferably is mounted on a bottom of the hull 34 at or near the stem of the watercraft 30. In the illustrated embodiment, the velocity sensor 46 incorporates a Pitot tube and senses a water pressure in the tube to detect a velocity of the watercraft 30; however, other types of velocity sensors (e.g., a paddle wheel sensor) can also be used. The velocity sensor 46 has a velocity sensor node 48 to transfer velocity data to the network 32.

In the illustrated embodiment, a passenger's area 52 is defined in the hull 34 from the transom to a mid portion of the hull 34. A remote controller 54 preferably is provided at a forward-most end of the passenger's area on the right-hand side. The illustrated remote controller 54 has a single control lever that is pivotally movable about a fulcrum to control both the throttle valve actuator and the transmission actuator. An operator can operate the control lever to set a desirable watercraft speed and to select one of the forward, neutral and reverse operations for the propeller 40A, 40B. The remote controller 54 has a remote controller node 56 to transfer throttle valve position control data and transmission position control data that represent how fast and in which direction the operator wants to move.

In a variation of the present embodiment, the remote controller 54 can have two control levers, each of which separately controls the throttle valve actuator and the transmission actuator. In another variation, stick or sticks that slidably move can replace the control lever or levers, respectively.

A steering device 60 preferably is placed next to the remote controller 54. The illustrated steering device 60 incorporates a steering wheel mounted on the hull 34 for pivotal movement. The steering device 60 changes the steering positions of the respective outboard motors 36A, 36B. The operator can operate the steering wheel to steer the outboard motors 36A, 36B. The steering device 60 has a steering node 62 to transfer steering position control data that represent the operator's desire to the network. The steering device, however, can take other forms, such as, for example, but without limitation, a handlebar, a joystick, or a yoke.

A display panel 66 preferably is disposed at or near the forward-most end of the passenger's area 52. In the illustrated embodiment, the display panel 66 is located between the remote controller 54 and the steering device 60 on the hull 34. The illustrated display panel 66 indicates an engine speed, a watercraft velocity, a transmission position, a direction of travel (e.g., north, northwest, etc.) and other information that is informative when operating the watercraft 30. Additionally in the illustrated embodiment, a switch key recess 68 to receive a switch key is formed in an area of the display panel 66. A main switch unit is formed under the panel 66. The operator inserts the switch key into the switch key recess 68 and rotates the switch key to turn the main switch unit on. The display panel 66 has a display node 70. The main switch unit also is electrically coupled with the display node 70.

A fish-finder 74 preferably is placed at or near the forward-most end of the passenger's area, and, in the illustrated embodiment, its location is on the left-hand side opposing to the remote controller 54. The fish-finder 74 can be used when fishing or diving, for example. The fish-finder 74 has a fish-finder node 76.

A bus or bus line 80 connects the drive nodes 42A, 42B, the velocity sensor node 48, the remote controller node 56, the steering node 62, the display node 70 and the fish-finder node 76 with each other to form the CAN 32. The drive nodes 42A, 42B, the velocity sensor node 48, the remote controller node 56, the steering node 62, the display node 70 and the fish-finder node 74 are terminal nodes of the CAN 32. A management node 82 also is connected to the bus 80 at least initially to manage the terminal nodes 42A, 42B, 48, 56, 62, 70, 76.

The illustrated bus 80 preferably is formed with twisted pair cables. Each terminal node 42A, 42B, 48, 56, 62, 70, 76 transfers a frame (e.g., a packet of information together with a header and/or a trailer that contains information that allows the packet to be forwarded efficiently to its destination) to communicate with each other using the common bus 80. In other words, a multi-processing communication is made among the terminal nodes 42A, 42B, 48, 56, 62, 70, and 76. An access method such as, for example, a carrier sense multiple access/collision detection (CSMA/CD) method preferably is used in this network communication system. However, at least some of the aspects and features of present transmittal device and method can be used with networks using a different protocol, such as, for example, token ring, ATM, and FDDI.

The bus level of the bus 80 can be the logical value "0" or the logical level "1." The logical value "0" is the dominant level of the bus 80 and is set when at least one of the nodes that is connected to the bus 80 outputs the logical value "0." The logical value "1" is the recessive level of the bus 80 and is set when all the nodes connected to the bus 80 output the logical value "1."

The bus 80 can be connect to the nodes 42A, 42B, 48, 56, 62, 70, 76, 82 in any forms such as, for example, a ring form and a star form. The bus 80 can use any cables or wires other than the twisted pair cables such as, for example, optical cables. Furthermore, a radio type bus (e.g., RF signal system) that has no cables or wires can replace the illustrated bus 80.

The CAN 32 preferably includes an electric power source such as, for example, one or more batteries to supply electric power at least to some or all of the nodes 42A, 42B, 48, 56, 62, 70, 76, 82. The power source can be used for other devices and electric components related to the outboard motors 36A, 36B and/or the watercraft 30. In the illustrated embodiment, the power source is in a state to supply all of the nodes 42A, 42B, 48, 56, 62, 70, 82, except for the fish-finder node 76, when the main switch unit is turned on. The illustrated fish-finder 74 has an own switch to activate the fish-finder 74 and the fish-finder node 76.

Figure 2:
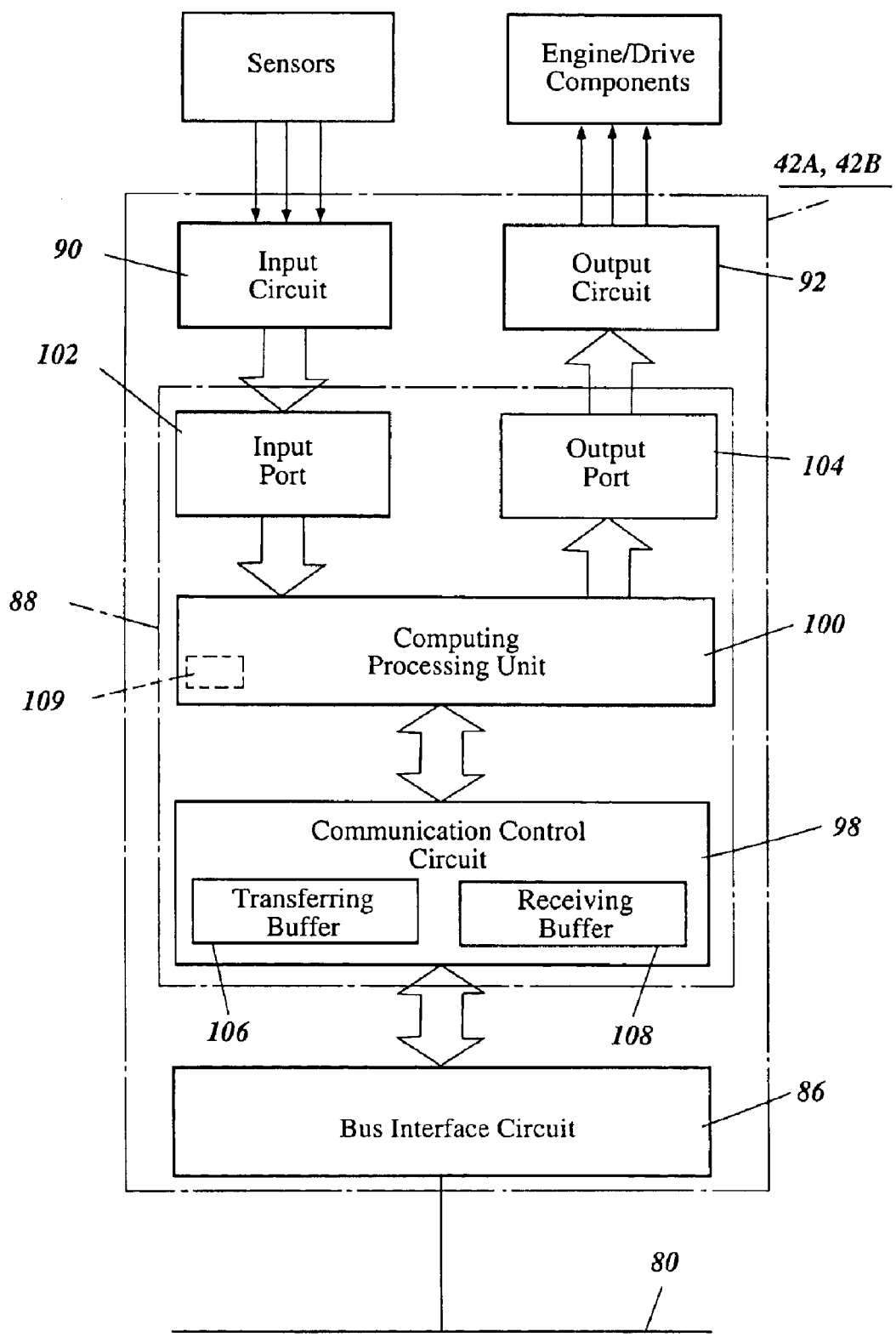
FIG. 2 illustrates a block diagram of a terminal node and, specifically, a drive node that is a member of the network and is provided at each outboard motor in the illustrated embodiment.

With reference to FIG. 2, each drive node 42A, 42B comprises a bus interface circuit 86, a micro-computer 88, an input circuit 90 and an output circuit 92. The micro-computer 88 is a central processor of the drive node 42A, 42B and includes a communication control circuit 98, a computing processing unit 100, an input port 102 and an output port 104.

The micro-computer 88 is connected to various sensors through the input circuit 90. In the illustrated embodiment, the sensors include a throttle valve position sensor that detects an actual position of the throttle valves, an engine speed sensor and other sensors (e.g., an air pressure sensor and an air temperature sensor) that sense engine/drive conditions. The input circuit 90 receives actual throttle valve position data from the throttle valve position sensor, engine speed data from the engine speed sensor and other control data, if any, from the other sensors and send the data to the input port 102.

The input port 102 receives the actual throttle valve position data, engine speed data and other control data, if any, from the inlet circuit 90 and passes the data over to the computing processing unit 102. The conversion from the analog signal to a digital signal can occur in the input circuit 90 or at the individual sensor.

The micro-computer 88 also is connected to engine/drive (i.e., engine and/or outboard motor) components through the output circuit 92. The engine/drive components at least include the throttle valve actuator, the fuel injectors, the spark plugs, the transmission actuator and the steering actuator. The output port 104 receives control data from the computing processing unit 100 and passes the data over to the output circuit 92. The output circuit 92 then transfers the control data to the engine/drive components. Preferably, the engine/drive components include their own drive and/or power/charging circuits that respond to the central data sent from the drive node; however, in some applications, such drive circuits for the various engine and outboard motor components (e.g., the throttle actuator) can be built into the output circuit 92. For example, in the illustrated embodiment, the engine includes a separate charging circuit for the spark plugs. The output circuit 92 sends the central data to the charging circuit to instruct when to cause each spark plug to discharge and ignite the charge in the respective combustion chamber. In other forms, however, such a charging circuit can be integrated into the output circuit 92.

Within the microprocessor 88, the computing processing unit 100 communicates with the communication control circuit 98 that has a transferring buffer 106 and a receiving buffer 108. The communication control circuit 98 is connected to the bus 80 through the bus interface circuit 86.

The computing processing unit 100 incorporates at least one non-volatile storage or memory 109 such as, for example, ROM or EPROM. The non-volatile storage 109 preferably stores a classification identifier or ID allotted to the drive node 42A, 42B and each product or part number, manufacturing number (e.g., serial number) and manufacturer model number of the outboard motor 36A, 36B. The classification identifier preferably is a serial number. Both the drive nodes 42A, 42B are assigned with the same classification identifier because the drive nodes 42A, 42B belong to the same classification. The product or parts number and the manufacturing number of one outboard motor 36A, 36B are discriminative with those of another outboard motor 36A, 36B. The manufacturer number may be the same as one another if the same manufacturer manufactures the outboard motor 36A, 36B. The product or parts number, the manufacturing number and the manufacturer number can be those of the engine 38A, 38B or other components or parts of the outboard motor 36A, 36B.

The computing processing unit 100 also incorporates one or more volatile storages such as, for example, RAM to store a network address (e.g., physical address) that will be assigned from the management node 82 to each terminal node.

The drive nodes 42A, 42B preferably have higher ranked communication priority in the CAN 32 than the other terminal nodes 48, 56, 62, 70, 74 because the drive nodes 42A, 42B directly affect an operation of the engine 38A, 38B or an operation of the outboard motor 36A, 36B. In order to realize the higher ranked priority, the frame of the drive nodes 42A, 42B preferably has a larger number of dominants (e.g., logical level "0") and the dominants preferably appear earlier than recessive in the sequential order. Other suitable bus arbitration protocol to assign a priority level to different devices can also be used.

Preferably, the management node 82 chooses a physical address that has a number of dominant bits when the management node 82 provides the physical address to either the drive node 42A or the drive node 42B.

The micro-computer 88 of each drive node 42A, 42B, and, particularly, the computing processing unit 100, controls the throttle valve position and the transmission position based upon the throttle valve position control data and the transmission position control data, respectively, that are sent by the remote controller node 56. The computing processing unit 100 also controls the steering position based upon the steering position control data sent by the steering node 62. Furthermore, in the illustrated embodiment, the computing processing unit 100 calculates fuel injection timing and injection duration for the fuel injectors and ignition timing for the spark plugs based upon, at least in part, the watercraft velocity data transferred from the velocity sensor node 48 and the actual throttle valve position data and the engine speed data transferred from the throttle valve sensor and the engine speed sensor, respectively. The micro-computer 88 of the drive nodes 42A, 42B then controls the fuel injectors and the spark plugs using the calculated results.

The drive nodes 42A, 42B also transfer the actual throttle valve position data and the actual transmission position data and additionally engine speed data to the display node 70 through the bus 80. Those data are indicated on the display panel 70.

Figure 3:
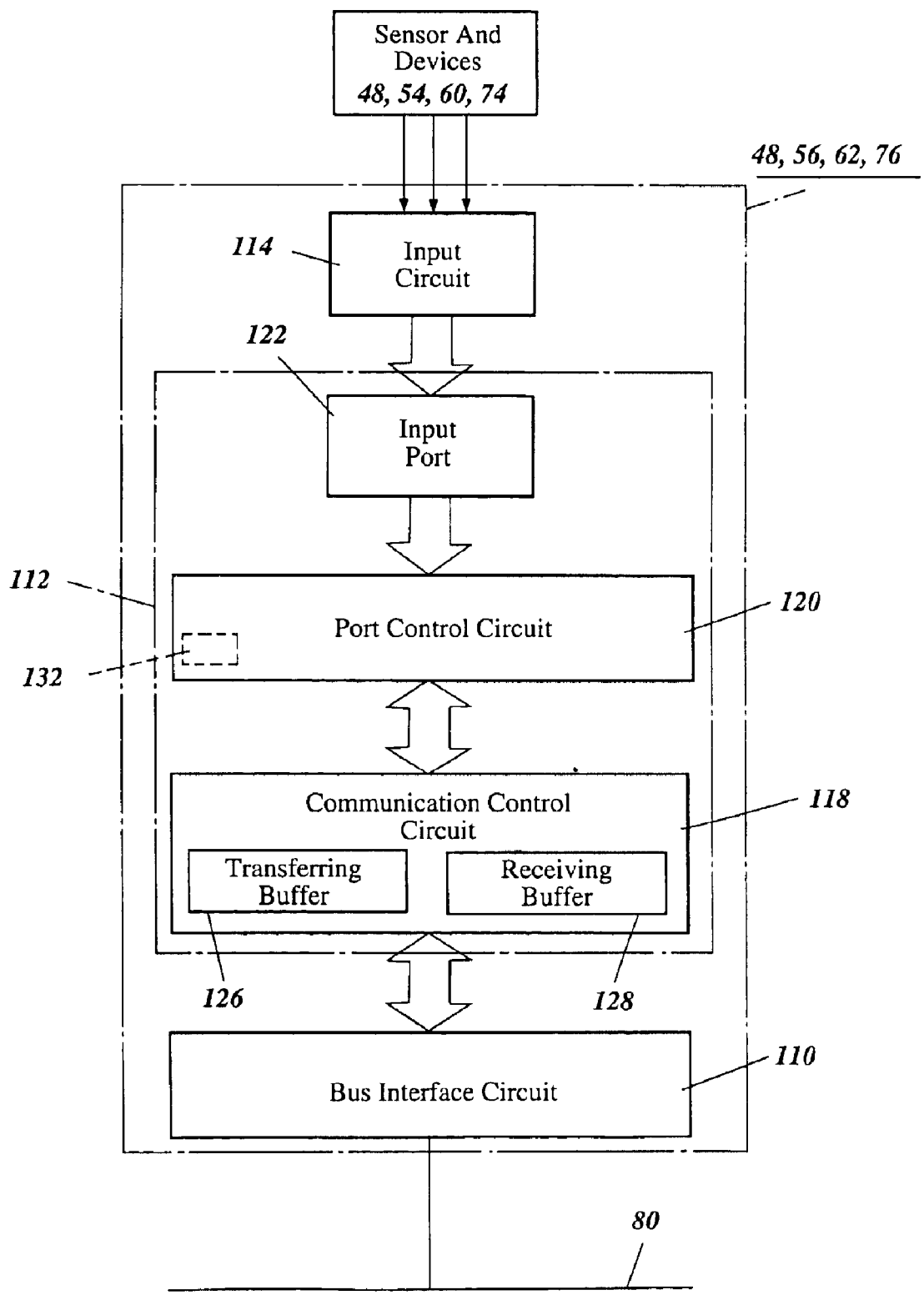
FIG. 3 illustrates a block diagram of another terminal node that can represent various nodes of the network such as a velocity sensor node, a remote controller node, a steering angle sensor node, and a fish-finder node; each of which can transmit data between a respective sensor of the watercraft and the network.

With reference to FIG. 3, the velocity sensor node 48, the remote controller node 56, the steering node 62 and the fish-finder node 76 each comprise the same node struction illustrated in FIG. 3. This node structure comprises a bus interface circuit 110, a micro-computer 112 and an input circuit 114. The micro-computer 112 is a central processor in each node 48, 56, 62, 76 and includes a communication control circuit 118, a port control circuit 120 and an input port 122.

The micro-computer 112 is connected to the respective sensor (the velocity sensor 48, the remote controller 54, the steering device 60 or the fish-finder 74) through the input circuit 114. The input circuit 114 receives date from the respective sensor watercraft velocity data from the velocity sensor 48, throttle valve position control data and transmission position control data from the remote controller 56, steering position control data from the steering device 60 and fish finding data from the fish-finder 74 and sends the data to the input port 122.

The input port 122 receives the data (either the watercraft velocity data, the throttle valve position and transmission position control data, the steering position control data or the fish finding data) from the inlet circuit 114 and passes the data over to the port control circuit 120.

Within the micro-processor 112, the port control unit 120 communicates with the communication control circuit 118 that has a transferring buffer 126 and a receiving buffer 128. The communication control circuit 118 is also connected to the bus 80 through the bus interface circuit 110.

The port control circuit 120 incorporates at least one non-volatile storage or memory 132 such as, for example, ROM or EPROM. The non-volatile storage 132 preferably stores at least a classification identifier or ID allotted to the respective one of the velocity sensor node 48, the remote controller node 56, the steering node 62 and the fish-finder node 76; and a product or parts number, manufacturing number and a manufacturer model number of the respective one of the velocity sensor 46, the remote controller 54, the steering device 60 and the fish-finder 74. The identifier preferably is a serial number.

The port control circuit 120 also incorporates one or more volatile storages such as, for example, RAM to store a network address (e.g., physical address) that will be assigned from the management node 82 to the respective node 48, 56, 62, 76.

Figure 4:
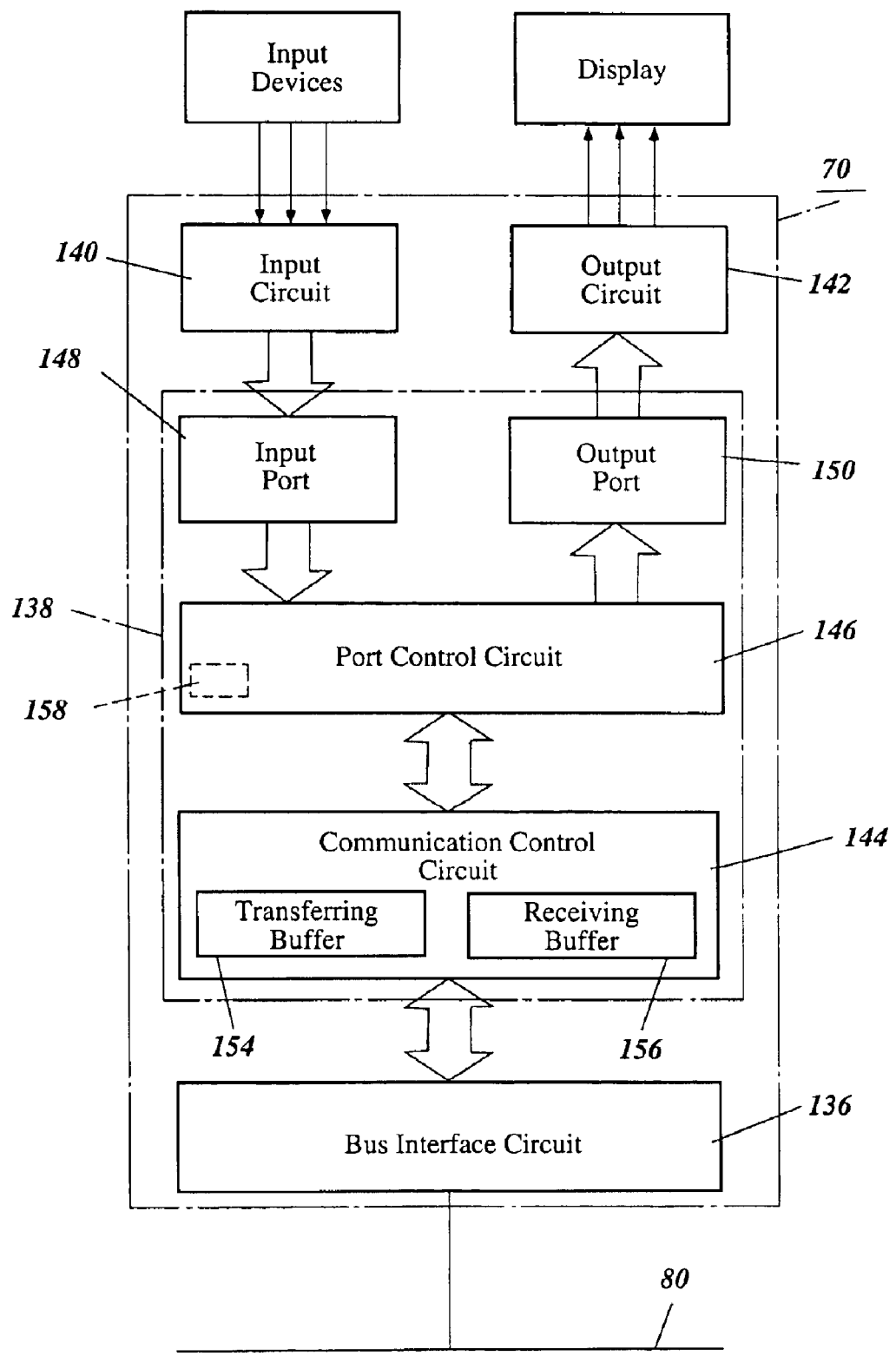
FIG. 4 illustrates a block diagram of another terminal node and, more specifically, a display node that is a member of the network and transmits data between a display panel of the watercraft and the network.

With reference to FIG. 4, the display node 80 comprises a bus interface circuit 136, a micro-computer 138, an input circuit 140 and an output circuit 142. The micro-computer 138 is a central processor of the display node 70 and preferably includes a communication control circuit 98, a port control circuit 146, an input port 148 and an output port 150.

The micro-computer 138 is connected to one or more devices that send data to be displayed on the display panel 66. In the illustrated embodiment, the devices communicate with the micro-computer 138 through the input circuit 140. Such device or devices can include a compass, for example. The input circuit 140 receives the display data from the device(s) and sends the data to the input port 140. The main switch unit under the switch key recess 68 also is connected to the input circuit 140 in this embodiment. The input port 148 receives the data from the inlet circuit 140 and passes the data over to the port control circuit 146.

The micro-computer 138 also is connected to respective indication elements of the display panel 66 through the output circuit 142. The output port 150 receives the display data from the port control circuit 146 and passes the data to the output circuit 142. The output circuit 142 then transfers the display data to the indication elements (e.g., a meter, a numerical or alpha numerical display, or a bar graph) of the display panel 66. The indication elements can includes a meter such as, for example, a residual fuel meter. In an variations, the residual fuel gauge on other types of displays can be provided separately from the display panel 66 and be coupled with the display node 70.

Within the micro-computer 138, the port control circuit 146 communicates with the communication control circuit 144 that has a transferring buffer 154 and a receiving buffer 156. The communication control circuit 144 is connected to the bus 80 through the bus interface circuit 136.

The port control circuit 146 preferably incorporates at least one non-volatile storage or memory 158 such as, for example, ROM or EPROM. The non-volatile storage 158 preferably stores at least a classification identifier or ID allotted to the display node 70 and a product or parts number, manufacturing number and a manufacturer model number of the display panel 66. The identifier preferably is a serial number.

The port control circuit 146 preferable also incorporates one or more volatile storages such as, for example, RAM to store a network address (e.g., a physical address) that will be assigned by the management node 82.

Figure 5:
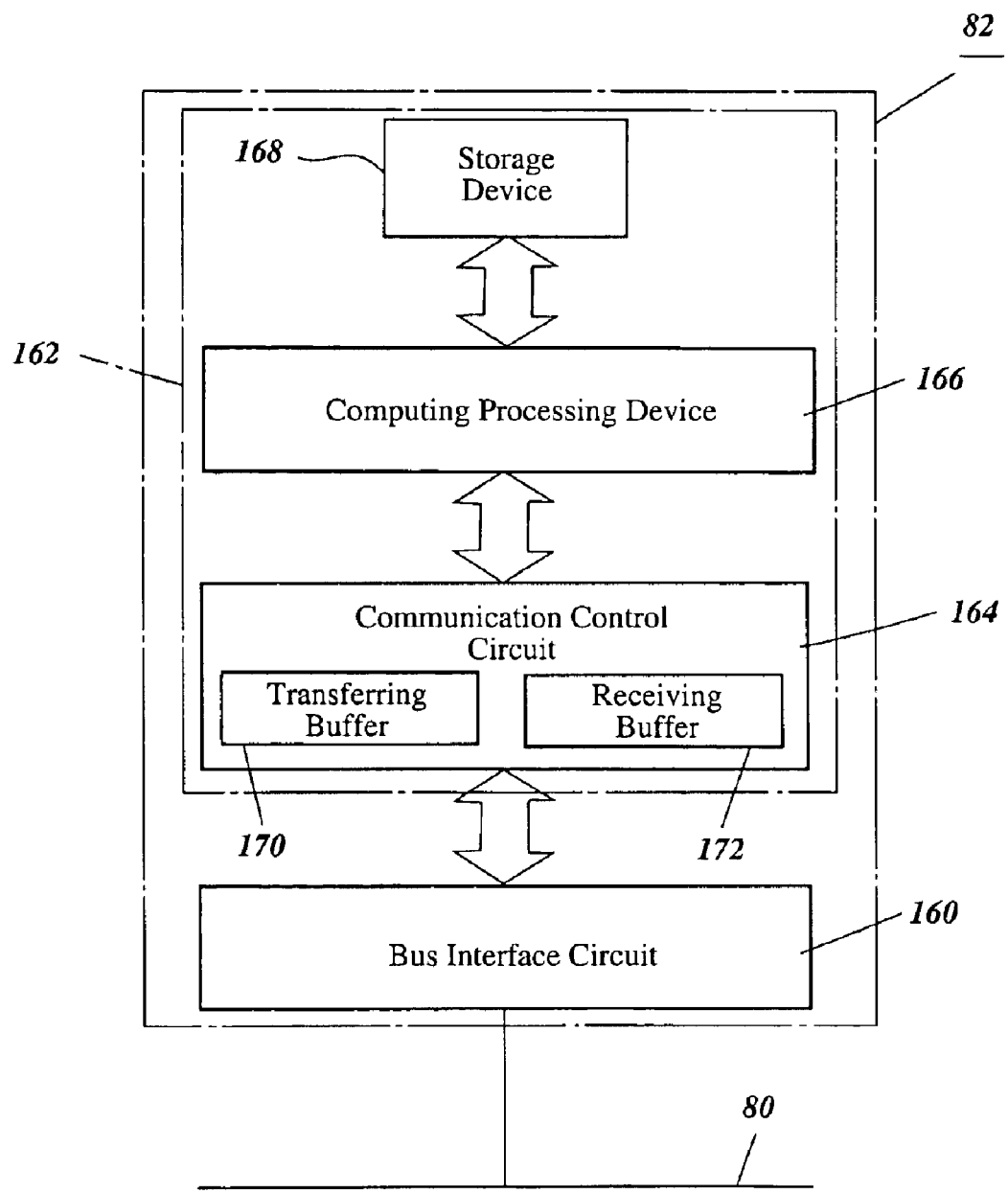
FIG. 5 illustrates a block diagram of the management node that is a member of the network and is located on the watercraft.

With reference to FIG. 5, the management node 82 (e.g., server) comprises a bus interface circuit 160 and a micro-computer 162. The micro-computer 162 is preferably a central processor of the management node 82 and includes a communication control circuit 164, a computing processing device 166 and a storage device 168.

The computing processing device 166 communicates with the communication control circuit 164 that has a transferring buffer 170 and a receiving buffer 172. The communication control circuit 118 is connected to the bus 80 through the bus interface circuit 160.

The computing processing device 166 also communicates with the storage device 168. The storage device 168 has at least one volatile storage or memory such as, for example, RAM. The storage device 168 can have non-volatile storages other than or in addition to the volatile storage. The storage device 168 preferably stores (1) a classification table indicating the relationships between classifications and the classification identifiers (ID), and (2) a physical address table (network address table) indicating the relationships between at least (a) physical addresses (network addresses) that will be assigned to the respective terminal nodes 42A, 42B, 48, 56, 62, 70, 76, (b) the classification identifiers (ID) of the terminal nodes 42a, 42b, 48, 56, 62, 70, 76, and (c) the manufacturing numbers of those terminal nodes 42A, 42B, 48, 56, 62, 70, 76. The physical addresses, the classification identifiers, and the manufacturing numbers are listed in individual columns for those items in the address list. The physical addresses can be set at the discretion of the management node 82.

In one variation, the storage device 168 can store other numbers than the manufacturing numbers that are selected from the product or parts numbers, the manufacturer numbers or the like. In another alternative, any of such numbers are selected together or are combined to make other numbers or codes, if necessary. Further, the physical addresses, the classification identifiers, the manufacturing numbers, the product or parts numbers, the manufacturer numbers and other numbers involved in this network system may include marks, symbols and other codes than numbers.

The management node 82 has a counter (not shown) that counts the number of times that the management node 82 has transferred an individual information transfer demanding frame, which will be described with reference to the flow chart of FIG. 6. The computing processing device 166 preferably incorporates the counter.

The foregoing communication control circuit 98, 118, 144, 164 of each node watches the transferred or received data and the bus level of the bus 80, detects arbitration results that will be described below and notifies the arbitration results to the respective one of the computing processing unit 100, the port control circuit 120, 146 or the computing processing device 166.

Also, the communication control circuit 98, 118, 144, 164 of each node detects various errors and notifies the errors to the respective one of the computing processing unit 100, the port control circuit 120, 146 or the computing processing device 166.

The errors include, for example, a bit error, a data error and/or a CRC error. The bit error is detected when the output level of each node and the level on the bus 80 are compared with each other and bits in each node output except for a stuffed bit or stuffed bits have different level with the bits on the bus 80. In the illustrated embodiment, the data error is detected when the same level is continuously detected (e.g., six bits or more) even a stuffed bit or stuffed bits are involved in a certain field. That is, normally, a reversed bit is added into a field to inhibit a burst error from occurring if some bits that has the same level abnormally continues (e.g., five bits). If the next bit also has the same level despite of this addition of the reversed bit, then a data error has occured.

The management node 82 provides the physical addresses (network addresses) to the terminal nodes 42A, 42B, 48, 56, 62, 70, 76, preferably while performing either an initial operation program 180, (the operational steps of which are illustrated in the flowchart depicted in FIG. 6) or an interrupt operation program 182 (the operational steps of which are illustrated in the flowchart in FIG. 7), as will be described.

Figure 6:
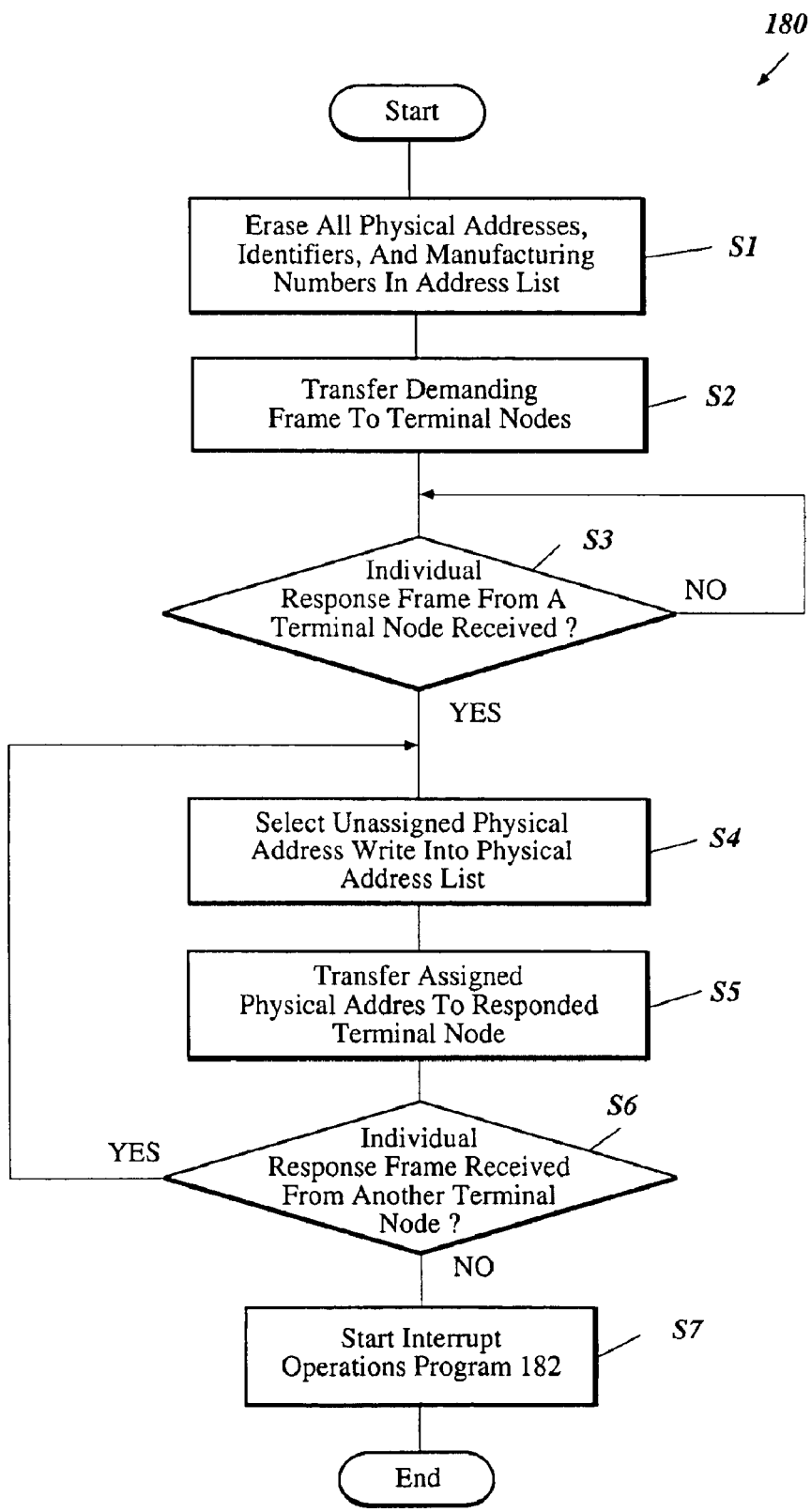
FIG. 6 illustrates a flow chart of an embodiment of an initial operation for providing network addresses to the terminal nodes.

With reference now to FIG. 6, the initial operation program 180 preferable starts when the main switch unit is turned on. The main switch unit in this embodiment is turned on when the operator rotates the switch key in the switch key recess 68. In this embodiment, all the terminal nodes 42A, 42B, 48, 56, 62, 70 except for the fish-finder node 76 are turned on when the main switch unit is turned on. The management node 82 waits for the terminal nodes 42A, 42B, 48, 56, 62, 70 to become ready to start before proceeding to run the program.

The management node 82, at the operation block S1, preferably erases all erasable values in its storage device 168. The management node 82 erases all the physical addresses, the classification identifiers and the manufacturing numbers previously recorded in the physical address table (network address table). The program 180 then proceeds to operation block S2.

At the operation block S2, the management node 82 creates an individual information transfer demanding frame that demands each terminal node 42A, 42B, 48, 56, 62, 70 to transfer at least its respective classification identifier (ID) and the manufacturing number (or similar identification number) to the management node 82. The management node 82 provides the individual information transfer demanding frame to the bus 80. Then, the micro-processor 162 of the management node 82 proceeds to decision block S3.

The management node 82, at the decision block S3, determines whether at least one individual information response frame has been received from one of the terminal nodes 42A, 42B, 48, 56, 62, 70. The fish-finder node 76 will not transfer this frame if the fish-finder 74 has not yet been turned on. The terminal nodes 42A, 42B, 48, 56, 62, 70, except for the fish-finder node 76, transfer the respective individual response frame to the management node 82. As will be discussed in greater detail below, all of the terminal nodes preferably transmit an individual response frame either after receiving the individual transfer demanding frame from the management node 82 or after a predetermined time period has elapsed after the terminal node has been detected. If it is determined in decision block S3 that no individual information response frame is yet received, the management node 82 repeats the decision block S3 until a response frame is received. If, however it is determined in decision block S3 that an individual information response frame is received from one of the terminal nodes 42a, 42b, 48, 56, 62, 70, the program 180 proceeds to operation block S4.

At the operation block S4, the management node 82 preferably refers to the physical address list stored in the storage device 168 and selects one physical address which has the smallest number that has not yet been allotted to any terminal node. At the very beginning, no physical address has been allotted, so the management node 82 can select the smallest number in the entire list and assign the number to the first responding node 42A, 42B, 48, 56, 62, 70 as the physical address for that node. The management node 82 writes or registers the selected physical address in a column of the physical address table, and also writes or registers at least the classification identifier (ID) and the manufacturing number in other columns of the physical address table corresponding to the column in which the physical address has been written. Of course the management node can write to other cells in the table provided that the cells in which the information in stored corresponds with one another (e.g., information written to cells in adjacent rows). The program 180 then proceeds to operation block S5.

The management node 82, at operation block S5, creates a physical address notification frame that includes a physical address packet containing the assigned physical address, the classification identifier and the manufacturing number for the first responding terminal node, and transfers the physical address notification frame to the first responding terminal node 42A, 42B, 48, 56, 62, 70. The program 180 proceeds to a decision block S6.

At the decision block S6, the management node 82 determines whether another individual information response frame has been received from another terminal node 42A, 42B, 48, 56, 62, 70. If the determination is positive, the management node 82 returns to operation block S4 and performs the steps described above for the next-to-respond terminal node. These steps are repeated for each responding terminal node, which usually includes all of the terminal nodes except for the fish finder node. If the determination is negative, the program 180 proceeds to an operation block S7. For each individual information response frame received, the management node transmits a physical address notification frame over the network. Each node extracts and stores the network address table in order to know the addresses of the other nodes.

At the operation block S7, the management node 82 starts the interrupt operation program 182 at the end of the initial operation program 180. At this point, all of the terminal nodes that have been assigned a network address can communicate with one another. Preferably the network communication protocol and structure are such that a frame from one node can be sent directly to another node.

As thus described, all the terminal nodes 42A, 42B, 48, 56, 62, 70, except for the fish-finder node 74, obtain the respective physical addresses in the initial assignment procedure of physical addresses. Once assigned, communication among those terminal nodes 42A, 42B, 48, 56, 62, 70 is available. Thus all the devices 36A, 36B, 38A, 38B, 46, 54, 62, 68 related to the terminal nodes 42A, 42B, 48, 56, 62, 70 are activated and can communicate with each other via the network 32. For instance, the operator can start the engines 38A, 38B and control the throttle valves of the engines 38A, 38B and the transmission mechanisms of the outboard motors 36A, 36B by operating the remote controller 54. The operator also can steer the outboard motors 36A, 36B by operating the steering device 60. The operator's commands are transmitted over the network to the drive terminals 42a, 42b, which then communicate with the respective outboard motors and associated steering actuators.

Figure 7:
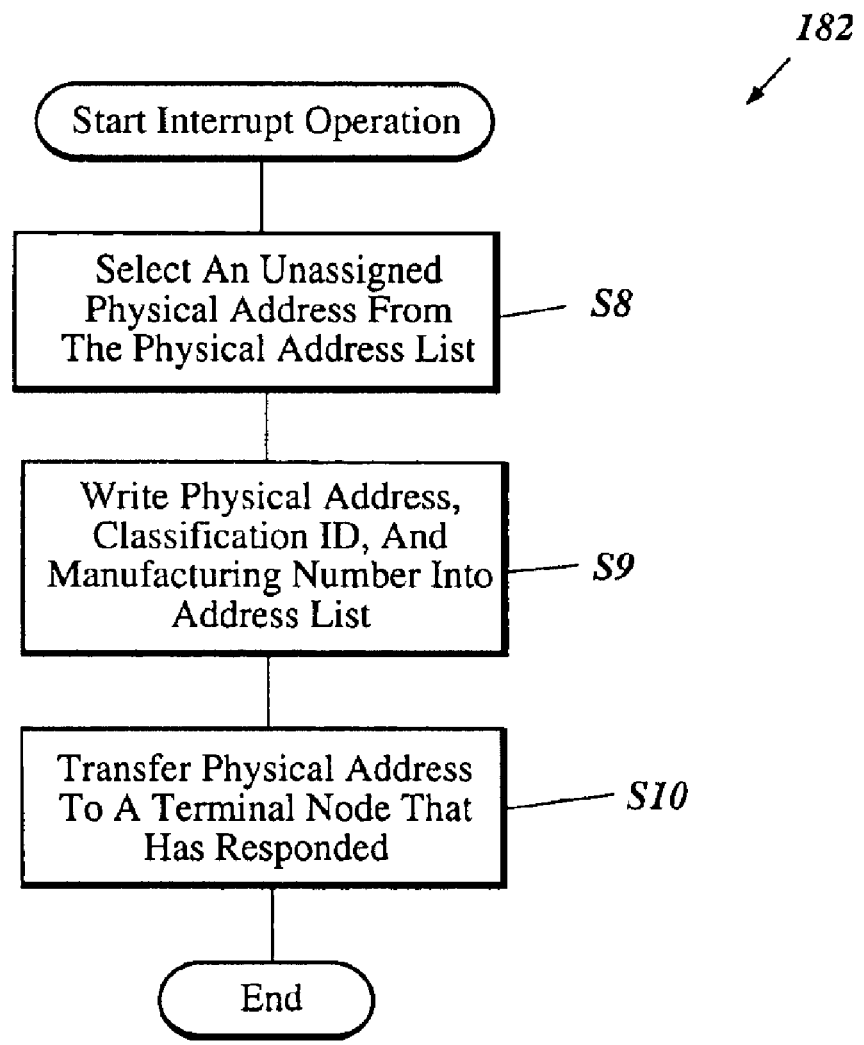
FIG. 7 illustrates a flow chart of an embodiment of an interrupt operation for providing network addresses to the terminal nodes.

With reference to FIG. 7, the interrupt operation program 182 starts when the management node 82 receives another individual information response frame from one of the remaining nodes after the management node 82 has cancelled its initial operation. The individual information response frame is sent automatically in the illustrated embodiment by the terminal node that is newly joining the network (either immediately or after a predetermined time period has elapsed); however, in other operational modes, the newly-joining terminal node can send the individual information frame in response to a demand frame that the management node 82 periodically sends out on the network after concluding its initial operation in accordance with a discovery protocol used by the network 82. The interrupt operation program 182 preferably has priority and can interrupt another program being performed at least in part by the management node 82. The remaining nodes include any nodes that have not been assigned a physical address. The fish-finder node 76 is an example of a remaining node when the fish finder node 76 is turned on or activated.

The program 182 starts and proceeds to operation block S8. At operation block S8, the management node 82 refers to the physical address list stored in the storage device 168 and selects the smallest number, which has not yet been allotted to any terminal nodes. This smallest number becomes a physical address that will be assigned to the terminal node that has transferred the individual information response frame that activates the interupt operation program 182. The program 182 then proceeds to operation block S9.

At the operation block S9, the management node 82 writes the selected physical address in a column of the physical address table. The management node also writes the classification identifier (ID) and the manufacturing number in other columns of the physical address table corresponding to the column in which the physical address has been written. The management node then proceeds to operation block S10.

At operation block S10, the management node 82 creates a physical address notification frame that includes a physical address list having a physical address, a classification identifier and a manufacturing number and transfers the physical address notification frame to a terminal node that requires the physical address. The management node then ends, and returns to a wait mode in which the management node 82 waits to receive another individual response frame if any.

Upon receiving the individual information response frame from the fish-finder node 76, the management node 82 starts the interrupt operation program 182 (FIG. 7).

Afterwards, the fish-finder node 76 can communicate other terminal nodes, particularly, the display node 70. Fish finding data caught by the fish-finder 74 thus can be displayed on the display panel 66 whenever the operator desires. Additionally, the interrupt assignment procedure conducted on the fish-finder node 76 does not meaningfully disrupt or delay the communications among the other terminal nodes 42A, 42B, 48, 56, 62, 70 by any significant degree because the interrupt operation is achieved within a very short time.

The terminal nodes can include nodes other than or in addition to the drive nodes 42A, 42B, the velocity sensor node 48, the remote controller node 56, the steering node 62, the display node 70 and the fish-finder node 76. For example, terminal nodes for audio devices (e.g., stereos), audio-visual devices (e.g., TV-sets), navigation systems, telephones, telephone control devices and personal computers can be included.

The illustrated management node 82 is independently and separately provided from other nodes and is connected to the bus 80. In one variation of the network 32, the management node 82 can be replaced by a micro-computer or the like that is provided at either the velocity sensor node 48, the remote controller node 56, the steering node 62 or the display node 70, which is simultaneously turned on when the main switch unit is turned on. The micro-computer preferably is loaded with at least the initial operation program 180 (FIG. 6) and the interrupt operation program 182 (FIG. 7).

Figure 8:
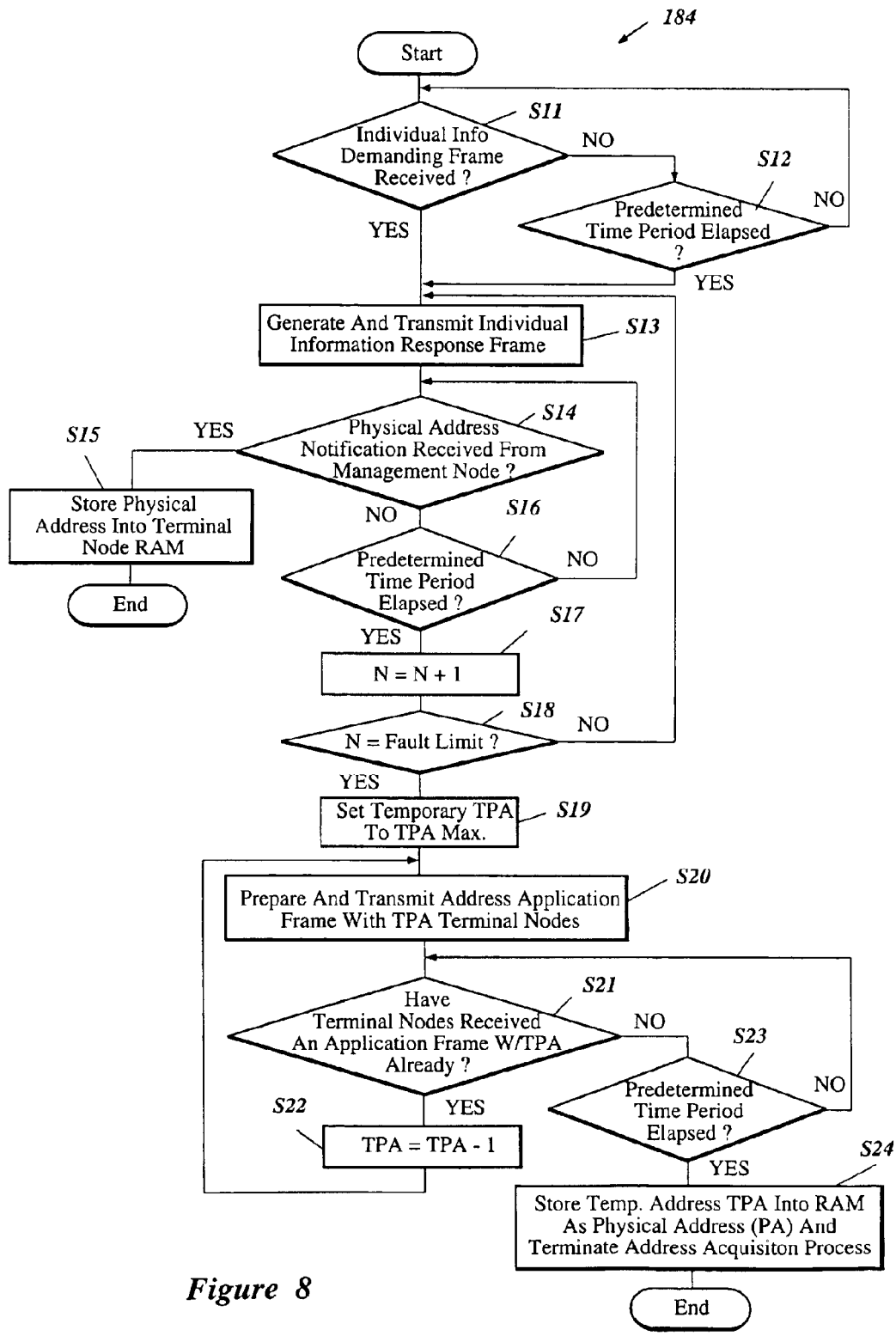
FIG. 8 illustrates a flow chart of an embodiment of an operation for obtaining network addresses from the management node.

With reference to FIG. 8, an operation program 184 that can be performed by one or more of the individual nodes is shown. The program 184 preferably is initiated by the terminal node when it is turned on. In the illustrated embodiment, each terminal node 42a, 42b, 48, 56, 62, 70, and 76 proceeds with this operation program when initially activated.

In decision block S11, the micro-processor of the terminal node determines whether the terminal node has received an individual information demanding frame from the management node. If in decision block S11 it is determined that the individual information demanding frame has been received, the program 184 proceeds to operation block S13.

If, however, in decision block S11 it is determined that the individual information demanding frame has not been received, the program 184 proceeds to decision block S12.

In decision block S12, it is determined whether a predetermined time period has elapsed. If the predetermined time period allowing for the individual information demanding frame to be received by the terminal nodes has not elapsed, the operation program 184 returns to the decision block S11.

If, however, the predetermined time period has elapsed, and the individual information demanding frame was not received from the management node 82 then the operation program 184 proceeds to operation block S13.

In operation block S13, the terminal node generates and transmits an inherent individual information response frame to the management node. The inherent individual information response frame preferably includes all of the information contained in the individual information response frame described above. The program 184 then continues to decision block S14.

In decision block S14, it is determined if a physical address notification frame has been received from the management node. If it is determined that the physical address notification frame has been received from the management node, then the program 184 continues to an operation block S15. In operation block S15, a physical address is stored into a terminal node RAM and the program ends. If, however, in decision block S14 it is determined that the physical address notification frame has not been received from the management node, the program proceeds to decision block S16.

In decision block S16, it is determined if a predetermined time period has elapsed. If the predetermined time period has not elapsed, the program 184 returns to decision block S14. If, however, it is determined that the predetermined time period has elapsed, a fault has occurred with the management node. The program continues to operation block S17.

In operation block S17, the program 184 in the illustrated embodiment begins counting the number of management node faults and sets a fault counter to N=N+1. The process then proceeds to decision block S18.

In decision block S18, it is determined if the fault code N equals a predetermined fault code limit. If in decision block S18 it is determined that the fault code N has not reached the predetermined fault limit, the program returns to operation block S13.

If, however, in decision block S18 it is determined that the fault code N is equal to the predetermined fault code limit, the process proceeds to operation block S19.

In operation block S19, the program 184 sets a temporary physical address in its memory to a maximum temporary physical address, TPAmax. The maximum temporary physical address TPAmax is a predetermined value used as an initial value to occupy the temporary physical address. The program then proceeds to operation block S20.

In operation block S20, the program 184 prepares and transmits an address application frame with the temporary physical address to the other terminal nodes. The program then continues to decision block S21.

In decision block S21, it is determined whether the management node has already allocated a physical address, which is the same as the temporary physical address, to another node. This is done by sending an address request frame, which includes the temporary physical address, to the other terminal nodes on the network. If no response is received, then the program concludes that the management node has not assigned an address, which is the same as the temporary address, to another terminal node. The routine performed by each of the terminal nodes in response to an address request frame will be described below with reference to FIG. 9. If the management node has directly given the temporary physical address to another terminal node, then the program 184 continues to operation block S22 where the temporary physical address is set to equal the temporary physical address minus a value of 1. The program then returns to operation block S20. If, however, in decision block S21 it is determined that the management node has not previously assigned the temporary physical address to another terminal node, the program continues to decision block S23.

In decision block S23, it is determined if a predetermined time period has elapsed. In decision block S23, if the predetermined time period has not elapsed, the program returns to decision block S21 to wait and see if a response is received from any of the terminal nodes.

If, however in decision block S23 it is determined that a predetermined time period has elapsed, the program 184 continues to operation block S24.

In operation block S24, the temporary physical address is stored into RAM of the terminal node as its physical address and the program 184 ends. Storing the temporary physical address into RAM as a physical address allows each terminal node to enter into communication with the other terminal nodes. Therefore, even if it is determined that a fault with the management node's address assigning function has occurred, the terminal nodes can still successfully communicate.

The above program can be further understood in the context of the fish-finder 74. When the fish-finder 74 joins the already active network, the fish-finder terminal node 76 awaits to receive the physical address notification frame from the management node 82 in response to the individual information response frame sent by the terminal node 76. The fish-finder terminal node 76 stores the physical address into RAM (see operation block S15), which allows communication through the network with the other nodes. This communication allows the display panel 66 to display information from the fish-finder 74. However, when a fault occurs with the management node 82, the fish-finder node 76 does not receive the physical address notification frame from the management node 82. Even when the management node 82 receives the independent information response frame, the fish-finder 74 cannot communicate with other nodes in the network without being assigned a physical address.

After a predetermined amount of time is allowed to pass, the fault counter determines if a fault is present with the management node 82. The temporary physical address of the fish-finder node 76 is set to the temporary physical address maximum value (TPAmax). Once the temporary physical address maximum value is compared to other physical address values to ensure against a duplicate physical address, the physical address is assigned to the fish-finder node 76 and the fish-finder node can communicate with the other nodes of the network.

Figure 9:
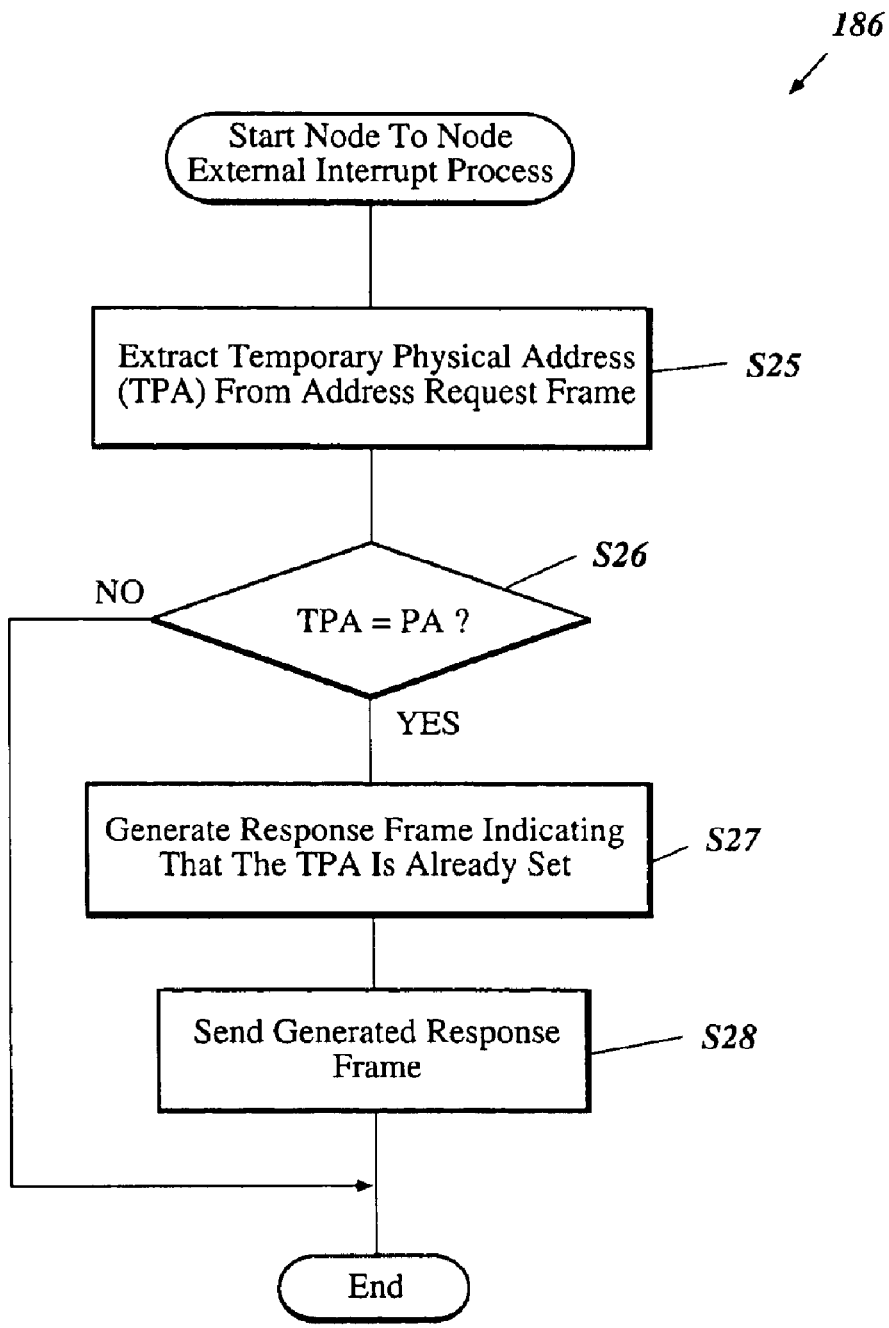
FIG. 9 illustrates a flow chart of an embodiment of an operation for obtaining network addresses through an external interrupt process.

Each active terminal node, i.e., each terminal node that has already obtained a physical address on the network 32, responds to the address application frame sent by a terminal node that is attempting to join the network in accordance with the routine shown in FIG. 8. In the illustrated embodiment, each active terminal node runs a program 186 when it receives the address request frame from another terminal node. With reference to FIG. 9, the program 186 starts a node to node external interrupt process and proceeds to an operation block S25 where a temporary physical address is extracted from the address application frame. The program then continues to decision block S26.

In decision block S26, the active terminal node determines if the temporary physical address equals its own physical address, which it had previously stored in its memory. In order to communicate with each other, two nodes cannot have the same physical address. If at decision block S26, the active terminal node determines that the temporary physical address from the address application frame is not equal to its own physical address, the active terminal node retains the temporary physical address information (e.g., the ID address application frame sent by the network address) from the terminal node attempting to join the network. The active terminal nodes treats the temporary physical address as the assigned address of the terminal node that is attempting to join the network, which allows communication between the active terminal node and the joining terminal node, unless the active terminal node receives another address application frame for the same terminal node. In that event, the active node will overwrite the old address information with the information from the information contained in the most recently received address application frame. The process then ends. If, however, at decision block S26, the active terminal node determines that the temporary physical address of the address application frame is equal to its own physical address, the active terminal node continues to operation block S27.

In operation block S27, the active terminal node generates a response frame indicating that the temporary physical address is used as the physical address of the active terminal node. The process then continues to operation block S28.

In operation block S28, the active terminal node sends the generated response frame, preferably setting a bit that indicates the TPA is already used. When the bit is set, the TPA is incremented by one and sent in a new address application frame to inform the requesting node that to communicate it must use this new TPA incremented by one. The node to node external interrupt process then ends.

If an active terminal node accepts the temporary physical address of the joining terminal node yet another active terminal node is using the identical address, the joining terminal node will send out the new TPA incremented by one. The active terminal node that originally accepted the original TPA will now check to see if the new TPA incremented by one is being used. If the new TPA incremented by one is not being used, the active terminal node will accept the TPA as the physical address.

Figure 10:
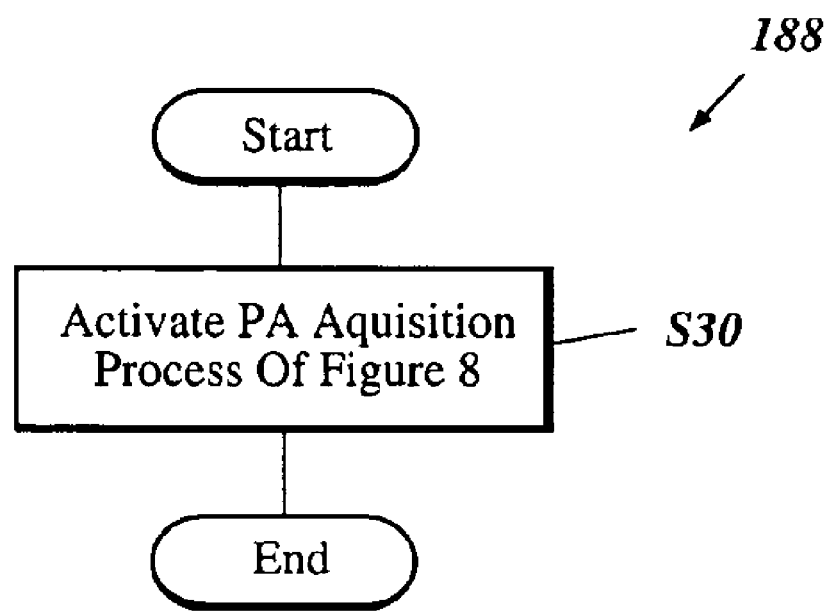
FIG. 10 illustrates a flow chart of an embodiment of an operation for activating the operation of obtaining network addresses from the management node.

With reference to FIG. 10, a process illustrated by a program 188 occurs when at least one of the terminal nodes receives the inherent individual information response frame from the terminal node that is entering the network. The program 188 starts and continues to an operation block S30. In operation block S30, the program 188 activates the program 184 of FIG. 8. The program 188 then ends.

In the event that the management node 82 enters the network after communication has been established between the individual terminal nodes (program 184, FIG. 8), which could occur if the management node experiences a temporary fault, the management node 82 creates the individual information transfer demanding frame as previously discussed in step S2 of FIG. 6. The individual information transfer demanding frame demands each terminal node 42A, 42B, 48, 56, 62, 70 to transfer at least its respective classification identifier (ID) and the manufacturing number (or similar identification number) to the management node 82. After receiving the individual information transfer demanding frame, the terminal nodes discontinue the established communication and send the respective individual information response frames to the management node. The established communication between the terminal nodes without the management node is discontinued allowing the management node to establish a generally more efficient manner of network management and network communication. The management node creates a physical address notification frame and transfers the physical address notification frame to the first responding terminal node 42A, 42B, 48, 56, 62, 70. The terminal nodes accept the new physical address from the management node and network communication is established.

Although this invention has been disclosed in the context of a certain preferred embodiment, variations thereof, and examples, it will be understood by those skilled in the art that the present invention extends beyond the specifically disclosed embodiments and variations to other embodiments and/or uses of the invention and obvious modifications and equivalents thereof apparent to those of ordinary skill in the art. In particular, while the present network has been described in the context of a particularly preferred embodiment, the skilled artisan will appreciate, in view of the present disclosure, that certain advantages, features and aspects of the network may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment, variations and examples described above, but should be determined only by a fair reading of the claims.

What is claimed is:

1. A multiple node network comprising a management node, a plurality of terminal nodes, and a bus arranged to connect and provide communication among the terminal nodes and the management node, the management node sending an individual information transfer demanding frame to each terminal node, at least one terminal node adapted to respond to the management node with an individual information response frame, the management node adapted to allocate a network address to each terminal node through a network address notification frame, at least one terminal node capable of allocating an arbitrary network address upon receiving no allocated network address from the management node when the terminal node is attempting to join the network and the terminal node determining that the management node has a fault, the arbitrary network address being converted to a network address by the terminal node when no other terminal node has a network address identical to the arbitrary address.

2. The network as set forth in claim 1, wherein at least one terminal node communicates with an engine electronic control unit, the engine electronic control unit configured to control at least one component of an engine of a vehicle.

3. The network as set forth in claim 2, wherein the vehicle is a personal watercraft.

4. The network as set forth in claim 2, wherein the vehicle is a boat.

5. The network as set forth in claim 1, wherein at least one terminal node communicates with at least one sensor that monitors an operating condition of an engine.

6. The network as set forth in claim 1, wherein at least one terminal node communicates with an actuator of an engine.

7. The network as set forth in claim 1, wherein the arbitrary network address is converted to a network address by the terminal node when a predetermined amount of time has elapsed.

8. The network as set forth in claim 1, wherein the management node comprises an information transfer unit that transmits an information transfer demanding frame to at least on terminal node, a network address unit that transmits the network address notification frame to the terminal nodes, and the at least one terminal node comprising an individual information unit that transmits an individual information response frame to the management node.

9. The network as set forth in claim 1, wherein the at least one terminal node sends out a different arbitrary address when another terminal node is already using a network address that is identical to the arbitrary network address initially allocated by at least one terminal node.

10. The network as set forth in claim 1, wherein each one of the terminal nodes communicates with the management node to obtain under normal operations a network address from the management node.

11. The network as set forth in claim 1, wherein each one of the terminal nodes belongs to a component of a system, each component having a unique identification code.

12. The network as set forth in claim 11, wherein the identification code contains an identifier that is selected from a group of component identifiers consisting of a product code, a part code, a manufacturing code and a manufacturer model code of the component.

13. The network as set forth in claim 11, wherein each identification code includes information that sets a communicating hierarchy among the various components that communicate via the network.

14. The network as set forth in claim 11, wherein the system is a vehicle, one of the components is a drive unit of the vehicle, and the identification code contains a parts code, a manufacturing code or a manufacturer model code of the drive unit or a member related to the drive unit.

15. A communication method between a plurality of nodes in a network, the nodes including terminal nodes and a management node configured to at least initially manage the terminal nodes, the method comprising the management node sending an individual information transfer demanding frame to one or more of the terminal nodes, the one or more terminal nodes responding to the management node with an individual information response frame, the management node allocating a network address the responding terminal node through a network address notification frame, at least one of the terminal nodes applying an arbitrary address upon detection that the management node has a fault when a terminal node is trying to join the network, converting the arbitrary address to an operating network address when no response from the management node is received and no other terminal node has been assigned the arbitrary address.

16. The communication method as set forth in claim 15, wherein the management node fault is determined when the terminal node does not receive the allocated network address frame from the management node.

17. The communication method as set forth in claim 15, wherein the arbitrary address is selected from a sequential order located in an address memory list, the arbitrary address being selected from one half of the sequential order.

18. A communication method between a plurality of nodes in a network, the nodes including terminal nodes and a management node configured to assign network addresses to each of the terminal nodes in normal operation, the method comprising:

determining a failure by the management node to assign a network address to one of the terminal nodes;

selecting an arbitrary network address for said one terminal node;

determining whether the arbitrary network address is identical to a network address currently used by one of the other terminal nodes; and using the arbitrary network address as the network address for said one terminal node if the arbitrary network address is not identical to a network address used by one of the other terminal nodes.

19. The communication method of claim 18 additionally comprising selecting another arbitrary network address if the first selected arbitrary network address is identical to a network address used by one of the other terminal nodes, determining whether said another arbitrary address is identical to a network address currently used by one of the other terminal nodes, and using said another arbitrary address as the network address for said one terminal node if the arbitrary network address is not identical to a network address used by one of the other terminal nodes.

20. The communication method of claim 19, wherein selecting another arbitrary network address involves incrementally decreasing the first selected arbitrary network address.

21. The communication method of claim 18, wherein determining a failure of the management node involves sending an individual information response frame to the management node and determining that a predetermined time period has elapsed without receiving a response from the management node.

22. The communication method of claim 21, wherein the management node failure is determined when no response is received from the management node after sending a plurality of individual information response frames to the management node and waiting the predetermined time period after sending each individual information response frame.

23. The communication method of claim 18, wherein the arbitrary network address is selected from an address list stored in memory in said terminal node.

24. The communication method of claim 23, wherein the arbitrary address is selected from one half of a list of network addresses arranged in sequential order.

25. The communication method of claim 18, wherein determining whether the arbitrary network address is identical to a network address used by another terminal node involves sending an address application frame to the network and waiting for a response.

26. The communication method of claim 25, wherein the arbitrary network address is used as the network address for said terminal node if no response is received within a predetermined time period from any of the other terminal nodes on the network.

27. The communication method of claim 18 additionally comprising communicating data to the network through one of the terminal nodes, wherein such data is indicative of an operating condition of an engine.

28. The communication method of claim 18 additionally comprising communicating data to the network through one of the terminal nodes, wherein such data is indicative of an operating condition of a vehicle.

29. A communication system for a vehicle comprising an engine, at least one sensor detecting an operating condition of the vehicle, and a network having a plurality of terminal nodes and a management node, at least one terminal node communicating with the engine and at least another one of the terminal nodes communicating with at least the sensor, the management node adapted to assign a network address to each terminal node when the terminal node is attempting to join the network, each terminal node capable of determining whether the management node has failed to assign the terminal node a network address and assigning itself a network address that is not currently used by any other terminal node active on the network.

30. A communication system for a vehicle as set forth in claim 29, wherein each terminal node is configured to send an address application frame to the network that contains an arbitrary network address when the management node has failed to assign the terminal node a network address, to wait receipt of a response frame from another terminal node active on the network, and to set the arbitrary address as its network address when the terminal node does not receive a response frame from any of the other terminal nodes active on the network.

31. A communication system for a vehicle as set forth in claim 30, wherein each terminal node is further configured to re-transmit the address application frame containing a different arbitrary network address when the terminal node receives a response frame from one of the other terminal nodes in response to a prior address application frame sent by the terminal node.

32. A communication system for a vehicle as set forth in claim 30, wherein each terminal node is configured to select randomly the arbitrary network address from a list of network addresses stored in a memory of the terminal node.

33. A communication system a vehicle as set forth in claim 30, wherein each terminal node is configured to select the arbitrary network address from one half of a sequential list of network addresses stored in a memory of the terminal node.

34. A communication system for a vehicle as set forth in claim 29, wherein each terminal node is configured to generate and transmit a response frame to the network when the terminal node receives an address application frame from another terminal node that contains an arbitrary address identical to the network address of the terminal node that received the address application frame.

* * * * *

UNITED STATES PATENT AND TRADEMARK OFFICE
CERTIFICATE OF CORRECTION

PATENT NO. : 6,859,692 B2 Page 1 of 1
DATED : February 22, 2005
INVENTOR(S) : Takashi Okuyama It is certified that error appears in the above-identified patent and that said Letters Patent is hereby corrected as shown below:

Column 20,
Line 34, after "system," insert -- for --.

Signed and Sealed this

Fourteenth Day of March, 2006

JON W. DUDAS
*Director of the United States Patent and Trademark Office*